United States Patent Office 2,867,659
Patented Jan. 6, 1959

2,867,659

POLYHALOGEN SUBSTITUTED MONOHYDROXY-DIPHENYL UREA AND THIOUREA COMPOUNDS

Ernst Model, Basel, and Jakob Bindler, Riehen, near Basel, Switzerland, assignors to J. R. Geigy A.-G., Basel, Switzerland, a Swiss firm No Drawing. Application August 16, 1956
Serial No. 604,306

Claims priority, application Switzerland
December 22, 1953

5 Claims. (Cl. 260—552)

The present invention concerns the production of polyhalogen substituted monohydroxydiphenyl urea and thiourea compounds which have at least one halogen substituent in each of the two benzene rings but however, no acid water solubilizing groups. It also concerns their use as disinfectants.

o-Hydroxydiphenyl urea and thiourea compounds which have at least one halogen substituent in each of the two benzene rings but no acid water solubilizing groups, are new. The can be produced by methods known per se by reacting halogen substituted o-hydroxyaminobenzene compounds with a compound introducing a halogen phenyl carbamyl- or thiocarbamyl radical into the primary amino group. Chiefly the halogen substituted phenyl isocyanates and/or phenyl mustard oils can be used as compounds which introduce the halogen phenyl carbamyl or thiocarbamyl radical. Phenyl carbamic acid phenol esters which are easily obtained from chloroformic acid phenol esters and halogen aminobenzenes can also be used as starting materials in the process according to the present invention, as, at even moderate temperatures with correspondingly chosen halogen-o-hydroxyaminobenzene compounds, they produce o-hydroxydiphenyl ureas according to the present invention whilst splitting off phenol. Also the reaction of suitably substituted phenyl ureido compounds with o-aminohydroxybenzene compounds chosen according to this invention leads, in individual cases, to polyhalogen substituted o-hydroxydiphenyl ureas. Finally, also the use of halogen benzoylazides, which under the conditions of the reaction known per se transform themselves whilst splitting off nitrogen into the corresponding halogen phenyl isocyanates, falls within the scope of the present invention. However, the addition of halogen phenyl isocyanate or halogen phenyl mustard oil to suitably substituted halogen-o-aminobenzene compounds is to be preferred to all other methods.

Examples of phenyl isocyanates or phenyl mustard oils which can be used in the process according to the present invention are: 4-chlorophenyl isocyanate, 3.4-dichlorophenyl isocyanate, 3-trifluoromethyl-4-chlorophenyl isocyanate, 4-bromophenyl isocyanate, 3.4-dibromophenyl isocyanate, 3.4.5-trichlorophenyl isocyanate, 2.3.4-trichlorophenyl isocyanate, 4-chlorophenyl mustard oil, 3.4-dichlorophenyl mustard oil, 3-trifluorophenyl-4-chlorophenyl mustard oil. They are reacted according to the invention with halogen substituted o-aminophenols. Examples of such are: 4-chloro-2-amino-1-hydroxybenzene, 5-chloro-2-amino-1-hydroxybenzene, 4.5-dichloro-2-amino-1-hydroxybenzene, 3.4.6-trichloro-2-amino-1-hydroxybenzene, 4- or 5-bromo-2-amino-1-hydroxybenzene, 4.6-dibromo- or dichloro-2-amino-1-hydroxybenzene, 4.5-dibromo-2-amino-1-hydroxybenzene, 4-chloro-5-trifluoromethyl-2-amino-1-hydroxybenzene, 4-chloro-5-bromo-2-aminophenol.

Phenyl carbamic acid phenol esters usable in the process according to the present invention are: 3.4-dichlorophenyl carbamic acid phenol ester or o-cresyl ester, 3-trifluoromethyl-4-chlorophenyl carbamic acid phenol or o-cresyl ester, 4-bromophenyl carbamic acid phenol ester, 3.4-dibromophenyl carbamic acid phenol ester.

According to the present invention, the components are so chosen that there is at least one halogen substituent in each benzene ring in the new 2-hydroxydiphenyl urea or thiourea compounds.

It is preferable that these halogen substituents occupy the p- and also, if desired, the m-position to the urea bridge. Halogen substitution in pairs in the m- and p-positions to the ureido group in at least one of the benzene rings is particularly advantageous. In this case, a halogen substituent in the benzene ring containing no hydroxyl groups can be replaced with the same effect by the trifluoromethyl group. If desired, also alkyl or alkoxy groups can be present as further substituents, e. g. a methyl group in either the m- or p-position to the hydroxyl group or in the o-position to the urea bridge in the benzene ring containing no hydroxyl groups.

Particularly valuable o-hydroxydiphenyl ureas according to this invention correspond to the general formula:

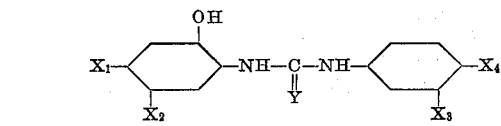

wherein $X_1$ to $X_4$ represent halogen or hydrogen, $X_3$ in addition may also represent the trifluoromethyl group whilst at least three of the four symbols X represent a halogen or halogen containing substituent as defined, and Y represents an oxygen or a sulphur atom, and wherein the two benzene rings can each contain a further substituent, e. g. another halogen or a methyl group.

These particularly valuable polyhalogen substituted o-hydroxy-diphenyl urea or thiourea compounds, with the critical halogen substitution as shown in the preceding formula, have a very bactericidal action, for example they are active against pus-causing bacteria such as, for example, Staphylococcus aureus. In particular they are very active against the bacterial flora which cause perspiration odours such as, for example against Sarcina, Proteus vulgaris, Bacillus mesentericus, and they are, for this reason and because of their low toxicity, very suitable for use as deodorants in laundering, and for human use when incorporated in cleansing agents such as soaps or shampoos, or as additives to cosmetic agents such as ointments or creams.

The following examples illustrate the invention without limiting it in any way. Where not otherwise stated, parts are given as parts by weight and the temperatures

EXAMPLE 1

A hot solution of 21.5 parts of 3.4-dichlorobenzoic acid azide in 50 parts by volume of toluene is added to the hot solution of 14.5 parts of 5-chloro-2-aminophenol in 250 parts by volume of toluene. After boiling for 15 minutes and then cooling the mixture, the N-3.4-dichlorophenyl-N'-2'-hydroxy-4'-chlorophenyl urea formed is filtered off. When recrystallised from diluted alcohol, it melts at 201–202°. This compound also has desirable fungicidal properties.

EXAMPLE 2

A mixture of 22.5 parts of 3.4-dichlorophenyl urea, 14 parts of 2-amino-4-chlorophenol and 40 parts by volume of glacial acetic acid is boiled until no more 2-amino-4-chlorophenol can be traced. The cooled mass is diluted with a little water whereupon it solidifies. The precipitate is filtered off and extracted with diluted caustic soda to remove the 5-chlorobenzoxazolone formed. The residue is dissolved in 15% alcohol with the addition of caustic soda lye, undissolved particles are filtered off and the N-3.4-dichlorophenyl-N'-2'-hydroxy-5'-chlorophenyl urea is precipitated with acetic acid. After recrystallising from dioxan it melts at 205–206°.

EXAMPLE 3

31 parts of 3.4-dichlorophenyl carbamic acid phenyl ester and 17 parts of 2-amino-4.5-dichlorophenol are dissolved in 100 parts by volume of dioxan and 50 parts of a 40% sodium acetate solution are added. The mixture is stirred at 90–95° until for practical purposes no more 2-amino-4.5-dichlorophenol can be traced, which is for about half an hour. N-3.4-dichlorophenyl-N'-2'-hydroxy-4'.5'-dichlorophenyl urea which has partly precipitated during the reaction is filtered off after cooling and recrystallised from tetrachlorethane. It melts at 201–202°.

EXAMPLE 4

18 parts of 2-amino-4.5-dichlorophenol are dissolved in 25 parts by volume of acetone and a solution of 17 parts of 4-chlorophenyl mustard oil in 25 parts by volume of acetone is added. The whole is stirred for 3 hours at 35°, diluted with water and the N-4-chlorophenyl-N'-2'-hydroxy-4'.5'-dichlorophenyl thiourea which precipitates is filtered off. After recrystallising from benzene it melts at 146–147° on decomposition.

EXAMPLE 5

A solution of 10 parts of 3.4-dichlorophenyl mustard oil in 40 parts by volume of benzene is added to a solution of 10 parts of 2-amino-4.5-dichlorophenol in 20 parts by volume of acetone. After stirring for 3 hours, the product is precipitated with petroleum ether and the separated N - 3.4 - dichlorophenyl - N' - 2' - hydroxy-4'.5'-dichlorophenyl thiourea is recrystallised from benzene. M. P. 159–160° on decomposition.

EXAMPLE 6

100 parts of an 18% solution of 3.4-dichlorophenyl isocyanate in nitrobenzene are added at 30–35° while cooling to a solution of 19 parts of 2-amino-5-bromophenol in 25 parts by volume of acetone. The whole is stirred for an hour, filtered, the product is washed with benzene and recrystallised from diluted alcohol. The N-3.4-dichlorophenyl - N' - 2' - hydroxy-4'-bromophenyl urea obtained melts at 198–199°.

EXAMPLE 7

100 parts of an 18% solution of 3.4-dichlorophenyl isocyanate in nitrobenzene are poured at 30–35° into a solution of 23 parts of 2-amino-4-chloro-5-bromophenol in 40 parts by volume of acetone and the whole is stirred for 1 hour. The N-3.4-dichlorophenyl-N'-2'-hydroxy-4'-bromo-5'-chlorophenyl urea is filtered off, boiled up with benzene to remove the nitrobenzene, again filtered off and recrystallised from diluted alcohol. M. P. 201–202° on decomposition.

EXAMPLE 8

111 parts of a 9% solution of 3-trifluoromethyl-4-chlorophenyl isocyanate in chlorobenzene is poured at 30° into a solution of 9 parts of 2-amino-4.5-dichlorophenol in 25 parts by volume of acetone. After stirring for 2 hours, the product is filtered off and recrystallised from benzene. N-3-trifluoromethyl-4-chlorophenyl-N' - 2' - hydroxy - 4'.5' - dichlorophenyl urea melts at 174–175°.

EXAMPLE 9

123 parts of a 9% solution of 3-trifluoromethyl-4-chlorophenyl isocyanate are poured at 30–35° into a solution of 11 parts of 3.4.6-trichloro-2-aminophenol in 50 parts by volume of acetone. On completion of the reaction, the N-3-trifluoromethyl-4-chlorophenyl-N'-2'-hydroxy-3'.5'.6'-trichlorophenyl urea formed is filtered off and recrystallised from diluted alcohol. M. P. 198–199°.

EXAMPLE 10

8 parts of 2-amino-4.6-dichlorophenol are dissolved in 70 parts by volume of acetone and the solution is poured at room temperature into 8 parts of 2.3.4-trichlorophenyl isocyanate in 30 parts by volume of acetone. After stirring for 2 hours, the product is filtered off. Recrystallised from glacial acetic acid, N-2.3-4-trichlorophenyl-N'.2'-hydroxy-3'.5'-dichlorophenyl urea melts at 214–215°.

EXAMPLE 11

100 parts of an 18% solution of 3.4-dichlorophenyl isocyanate in nitrobenzene are added at 30° to a solution of 22 parts of 2-amino-4.5.6-trichlorophenol in 50 parts by volume of acetone. After stirring for one hour, the N - 3.4 - dichlorophenyl - N' - 2' - hydroxy - 3'.4'.5'-trichlorophenyl urea is precipitated with petroleum ether, filtered off and recrystallised from chlorobenzene. M. P. 210–211° on decomposition.

The bactericidal properties and the melting points of some diphenyl urea or thiourea compounds according to this invention can be seen from the following table. The bactericidal properties were determined on *Staphylococcus aureus* as follows:

A standard suspension, which is prepared by adding sterilised tap water to the germs of 16 hour agar cultures, the density of which is brought to 85% transparency in the so-called Bio-Photo-Col-apparatus according to Hellige, is mixed with graduated dilutions of the disinfectant to be tested (in aqueous solution). Duration of test: 10 minutes, temperature: 20°.

At the end of the 10 minutes, 2 sub-cultures from each reaction mixture are prepared with a glucose broth. The sub-cultures are bred at 37° C. After 48 hours, the development or sterility of the sub-cultures is determined. The bactericidal activity of a disinfectant is determined by the minimal concentration required to kill, with certainty, a standard suspension of test germs under certain conditions. The minimal concentration having a bactericidal action is ascertained by graduated concentrations according to the dilution process principle and is expressed in $10^{-6}$ mol.

Table

| No. | o-Aminophenol | Phenyl | M. P. | Minimal bactericidal concentration expressed in $10^{-6}$ mol |
|---|---|---|---|---|
| | | Ureas | | |
| 1 | 4-Cl, 2-NH- (OH at 1) | 3,4-diCl-phenyl | 206–207° | 25 |
| 2 | 4-Cl, 2-NH- (OH at 1) | 3,4-diCl-phenyl | 201–202° | 12.5 |
| 3 | 4-Br, 2-NH- (OH at 1) | 3,4-diCl-phenyl | 198–199° | 25 |
| 4 | 4-Cl, 2-NH- (OH at 1) | 2,3,4-triCl-phenyl | 204–205° | 25 |
| 5 | 4-Cl, 5-Br, 2-NH- (OH at 1) | 3,4-diCl-phenyl | 201–202° on decomposition | 12.5 |
| 6 | 4,5-diCl, 2-NH- (OH at 1) | 3-Cl-4-CF$_3$-phenyl | 174–175° | 6.2 |
| 7 | 4,5-diCl, 2-NH- (OH at 1) | 3,4-diCl-phenyl | 201–202° | 3.1 |
| 8 | 3,5-diCl, 2-NH- (OH at 1) | 2,3,4-triCl-phenyl | 214–215° | 12.5 |
| 9 | 3,4,6-triCl, 2-NH- (OH at 1) | 3-Cl-4-CF$_3$-phenyl | 198–199° | 6.2 |

Table—Continued

| No. | o-Aminophenol | Phenyl | M. P. | Minimal bactericidal concentration expressed in $10^{-8}$ mol |
|---|---|---|---|---|
| 10 | 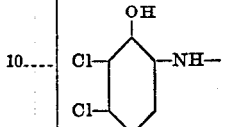 | 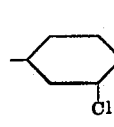 | 210–211° on decomposition | 3.1 |
|  | *Thioureas* |  |  |  |
| 11 | 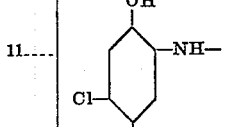 | 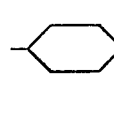 | 146–147° on decomposition | 12.5 |
| 12 | 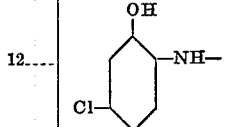 | 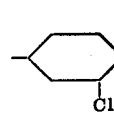 | 159–160° on decomposition | 12.5 |

*Example 12*

99 parts of soap flakes and 1 part of N-3.4-dichlorophenyl-N'-2'-hydroxy-4'.5'-dichlorophenyl urea together with a little perfume are well mixed either direct or dissolved in a little alcohol in a mixing apparatus. The finished mixture is refined by rolling and then pressed into tablet form. A toilet soap having a deodorant action is thus obtained.

A similar good action is obtained if 97 parts of soap flakes and 3 part of N-3.4-dichlorophenyl-N'-2'-hydroxy-3'.4'.5'-trichlorophenyl urea are used as starting materials.

*Example 13*

A 1% aqueous solution of a cleansing agent which contains 10 parts of one of the diphenyl ureas named in Example 12 and 90 parts of non-ionogenic or anion active synthetic washing agent, produces a washing liquor which is suitable for example for the cleansing of household or personal linen.

This application is a continuation-in-part of copending application, Serial No. 476,542, filed December 20, 1954 (now abandoned).

What we claim is:

1. A polyhalogen compound of the formula:

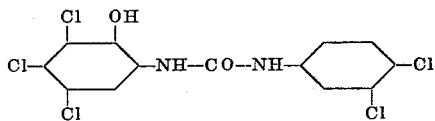

2. A polyhalogen compound of the formula:

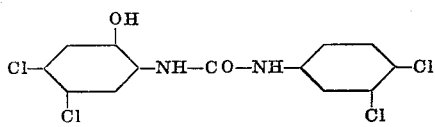

3. A polyhalogen compound of the formula:

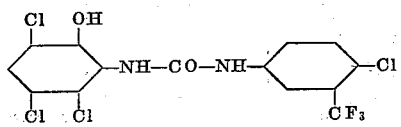

4. A polyhalogen compound of the formula:

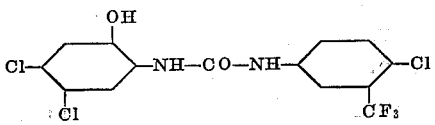

5. A polyhalogen compound of the formula:

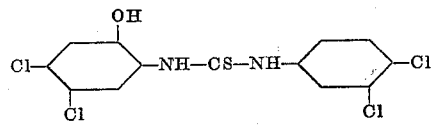

References Cited in the file of this patent

UNITED STATES PATENTS 2,651,620    Hill et al. _____ Sept. 8, 1953

FOREIGN PATENTS 1,116,333    France _____ Jan. 30, 1956
487,014      Germany _____ Dec. 9, 1929

OTHER REFERENCES

Hagelloch et al.: "Z. Naturforsch," vol. 6–b (1951), page 151. (Available Naval Research Library.)

Sah et al.: "Rec. Trav chim," vol. 59 (1940), pp. 364–68.

Sah et al.: "J. Chinese Chem. Soc.," vol. 14 (1946), pp. 74–83. (Available Nat. Bur. Standards.)